Patented Aug. 19, 1952

2,607,775

UNITED STATES PATENT OFFICE 2,607,775

VINYLPYRIDINE-MERCAPTAN ADDUCTS

William Howells Vinton, Wilmington, Del., assignor to E. I. du Pont de Nemours & Company, Wilmington, Del., a corporation of Delaware No Drawing. Application August 4, 1945, Serial No. 609,029

6 Claims. (Cl. 260—290)

This invention relates to new thioethers and to a process for producing them.

This invention has as an object the preparation of new compositions of matter. A further object is the preparation of a new class of thioethers. A still further object is the preparation of a new class of substituted heterocyclic amines having attaching to nuclear carbon a beta-mercaptoethyl group wherein the mercapto hydrogen is replaced by a monovalent hydrocarbon radical. Other objects will appear hereinafter.

These objects are accomplished by the following invention wherein a mercaptan, RSH, wherein R is a monovalent hydrocarbon radical, is reacted with a C-vinyl heterocyclic amine in which the amine group is part of the heterocyclic ring and the vinyl group is attached to nuclear carbon, and the resulting reaction product which is a C-substituted heterocyclic amine having, attached to nuclear carbon, a group of the formula $RSCH_2CH_2—$, wherein R is as above, and having the amino group as part of the heterocyclic ring is isolated.

Under the usual conditions of this reaction approximately equimolar quantities of the mercaptan and the C-vinyl heterocyclic amine are brought together in intimate contact at room temperature either in the presence or absence of ultraviolet light and the reaction is continued until a substantial proportion of the mercaptan has reacted with the vinyl compound. This can be readily determined by titrating an aliquot portion of the reaction mixture with iodine according to the standard analytical procedure for thiol determination. After the completion of the reaction the product is then isolated and purified by vacuum distillation or crystallization. The reaction is generally exothermic and can be controlled by external cooling or by adding any or both of the reactants to the reaction mixture at such a rate that excessive temperatures are not developed. Frequently it is desirable to have a vinyl polymerization inhibitor present in the reaction mixture to prevent excessive polymer formation in the C-vinyl heterocyclic amine.

The invention is illustrated by the following examples in which parts are by weight.

Example 1

In a transparent "Vycor" glass reaction vessel chilled in "Dry Ice"-acetone mixture were placed 48.0 parts (1.00 mole) of purified methyl mercaptan and 95 parts (0.90 mole) of freshly distilled 2-vinylpyridine stabilized with a trace of hydroquinone. Catalytic amounts (0.1 part) of benzoyl peroxide and diphenyl disulfide were added to the reaction mixture which was then permitted to warm up to room temperature and to reflux gently while being irradiated with an H-4 ultra-violet lamp. Irradiation was continued at room temperature for 14 hours, after which time an aliquot portion was removed and titrated with iodine. The titration indicated that 87.6% of the methyl mercaptan had reacted. The mixture was then distilled under nitrogen in a distilling apparatus. After removal of unreacted methyl mercaptan, the bulk of the material distilled uniformly at 85.5° C. at 1.5 mm. The product, 2-[beta-methylthioethyl]pyridine, was a water-white liquid of characteristic odor and amounted to 96.6 parts or 70% of theory.

Analysis: Calculated for $C_8H_{11}NS$: C, 62.8%; H, 7.19%.

Found: C, 63.15%, 63.06%; H, 7.76%, 7.66%.

The following values were also determined for this product: specific gravity $$\frac{25°}{4} \text{ C.: } 1.0537$$

refractive index at 25° C.: 1.5492.

Example 2

In a transparent "Vycor" glass reaction vessel fitted with a reflux condenser and a stirrer were placed 45.0 parts (0.50 mole) of redistilled tertiary butyl mercaptan and 52.5 parts (0.50 mole) of freshly distilled 2-vinylpyridine stabilized with a trace of hydroquinone. The reaction mixture was then irradiated for 10 hours at room temperature with ultra-violet light generated by an H-4 lamp. At the end of this time, a portion of the tertiary butyl mercaptan appeared to have reacted as determined by iodine titration of an aliquot portion. The reaction mixture was then transferred to a distillation apparatus and distilled under nitrogen. Unreacted tertiary butyl mercaptan and unreacted 2-vinylpyridine were removed as the first fractions, and the residual liquid, boiling from 108 to 122° C. at 3 mm. pressure, amounted to 11 parts (11.3% of theory) of 2-[beta-(butylthio)ethyl]pyridine. The product was a pale yellow-brown liquid of characteristic unpleasant odor having the determined specific gravity $$\frac{25°}{4} \text{ C. of 0.9970}$$

and refractive index at 25° C. of 1.5268.

Analysis: Calculated for $C_{11}H_{17}NS$: N, 7.18%.

Found: N (Dumas), 7.51%, 7.23%.

Example 3

In a reaction vessel fitted with a stirring apparatus, thermometer and addition means was placed 124.0 parts (1.00 mole) of benzyl mercaptan. One hundred five parts (1.00 mole) of 2-vinylpyridine stabilized with a trace of hydroquinone was added rapidly to the stirred reaction mixture, and the exothermic reaction which occurred was checked at 105° C. by cooling externally until further exothermic changes were no longer evident. The crude reaction product was distilled under nitrogen in a distillation apparatus, and after removal of unreacted 2-vinylpyridine the main portion of the product distilled at 146° C. at 1 mm. pressure. There was obtained 154.6 parts (67.5% of theory) of 2-[beta-(benzylthio)ethyl]pyridine having a faint yellow color and a characteristic unpleasant odor. The product has a specific gravity $$\frac{25°}{4} \text{ C. of } 1.0976$$

and a refractive index at 25° C. of 1.5920.

Analysis: Calculated for $C_{14}H_{15}NS$: N, 6.12%.
Found: N (Dumas), 6.65%, 6.44%.

Example 4

In a reaction vessel fitted with a stirring apparatus, a thermometer and an addition means was placed 62.0 parts (0.50 mole) of p-thiocresol (p-tolyl mercaptan). With rapid stirring there was added slowly 52.5 parts (0.50 mole) of freshly distilled 2-vinylpyridine stabilized with a trace of hydroquinone. After about ⅓ of the vinyl pyridine had been added, a rapid exothermic reaction began and the temperature was allowed to rise to 65° C. and held at that temperature by external cooling until the exothermic reaction ceased. The titration of an aliquot portion showed that the reaction was 99% complete. The product was then distilled in a vacuum distillation apparatus and 109 parts or 95.5% of theory of 2-[beta-(p-tolylthio)ethyl]pyridine boiling at 152-153° C. at 0.7 mm. was obtained. The product was a pale yellow liquid possessing a faintly unpleasant odor. It had a specific gravity $$\frac{25°}{4} \text{ C. of } 1.0925$$

and a refractive index at 25° C. of 1.5962.

Analysis: Calculated for $C_{14}H_{15}NS$: C, 73.4%; H, 6.55%.
Found: C, 74.50%, 74.27%; H, 7.10%, 7.03%.

Example 5

In a transparent "Vycor" reaction vessel was placed 101.0 parts (0.50 mole) of purified dodecyl mercaptan and to this was added 52.5 parts (0.50 mole) of 2-vinylpyridine. The mixture was irradiated by means of an H-4 lamp for 60 hours with ultraviolet light in the presence of 0.10 parts of diphenyl disulfide and without extreme heating. At the end of this time, an aliquot sample titrated with iodine solution showed that only 17.5% of the dodecyl mercaptan remained unreacted. The mixture was distilled in a distilling apparatus under nitrogen and after removal of 37 parts of low boiling material, 76.8 parts (50.0% of theory) of 2-[beta-(dodecylthio)ethyl]pyridine boiling at 182° C. at 0.13 mm. was obtained. The product is a light yellow liquid which has a specific gravity $$\frac{25°}{4} \text{ C. of } 0.9634$$

and a refractive index at 25° C. of 1.5038.

Analysis: Calculated for $C_{19}H_{33}NS$: N, 4.56%
Found: N (Dumas), 5.10%.

Example 6

In a reaction vessel fitted with a stirring mechanism, an additional means, and a thermometer were placed 40.0 parts (0.25 mole) of 2-naphthyl mercaptan and about 100 parts of dry chlorobenzene. To the rapidly-stirred solution was added slowly 26.25 parts (0.25 mole) of 2-vinylpyridine stabilized with a trace of hydroquinone. An exothermic reaction occurred in which the maximum temperature reached was 70° C. After cooling to room temperature the titration of an aliquot portion with iodine solution showed that the reaction was 94% complete. The chlorobenzene was removed at 75° C. under water pump vacuum. The remaining product was distilled in a vacuum distillation apparatus under nitrogen and 26.8 parts (40.5% of theory) of 2-[beta-(2-naphthylthio)ethyl]pyridine boiling at 168-170° C. at 0.05 mm. was obtained. The product was a viscous yellow liquid having a specific gravity $$\frac{25°}{4} \text{ C. of } 1.1422$$

and a refractive index at 25° C. of 1.6556.

Analysis: Calculated for $C_{17}H_{15}NS$: C, 77.0%; H, 5.66%; N, 5.29%; S, 12.09%.
Found: C, 76.73%, 76.70%; H, 5.88%, 5.85%; N (Dumas), 5.50%, 5.76%; S, 12.24%, 11.90%.

While this invention has been illustrated with particular reference to 2-vinylpyridine, it is contemplated that the reaction described is operative with other C-vinyl heterocyclic amines in which the amino group is part of the heterocyclic ring and the vinyl group is attached to nuclear carbon thereof, for example: 3-vinylpyridine, 4-vinylpyridine, 2-vinylquinoline, 2-vinylpiperidine, 2-vinylpyrrolidine, 5-ethyl-2-vinylpyridine, etc. Heterocyclic amines having the amino nitrogen as the only hetero atom are preferred.

As illustrated by the examples both aliphatic and aromatic mercaptans are operable for forming the products of this invention. Other mercaptans, aliphatic, aromatic, and alicyclic, may be used including ethyl mercaptan, n-propyl mercaptan, isopropyl mercaptan, n-butyl mercaptan, octyl mercaptan, cyclohexyl mercaptan, 1-phenylethyl mercaptan, thiophenol, and p-xylyl mercaptan. Mercaptans free from ethylenic and acetylenic unsaturation, i. e. free from non-aromatic unsaturation, are preferred.

The reaction of the C-vinyl heterocyclic amine with the mercaptan can generally be carried out between room temperature (20° C.) and 200° C. although temperatures of 100° C. are generally sufficient. The reaction is carried out usually at atmospheric pressure although superatmospheric pressure may be used if desired. The reaction is ordinarily allowed to proceed until a substantial proportion of the mercaptan has reacted and this can be determined by titration of an aliquot portion of the reaction mixture with iodine according to the common analytical procedure for determining thiols. In carrying out the reaction to form the products of this invention it is frequently desirable to make use of ultraviolet light either with or without photocatalysts, for example, benzoyl peroxide and diphenyl disulfide, which are sometimes added to assist the reaction.

The reaction may be carried out without added solvent or in the presence of solvents which are inert to the reactants. Solvents which can be used include chlorobenzene as illustrated by Example 6. Other solvents include toluene, ethanol, butanol, benzene and the like.

It is frequently desirable to include in the reaction mixture a small amount of a polymerization inhibitor, for example, hydroquinone, to prevent excessive polymerization of the C-vinyl heterocyclic amines.

The compounds of this invention are useful as dyestuff intermediates, pesticides, and for pharmaceutical purposes.

The above description and examples are intended to be illustrative only. Any modification thereof or variation therefrom which conforms to the spirit of the invention is intended to be included within the scope of the claims.

What is claimed is:

1. 2-Benzylthioethylpyridine

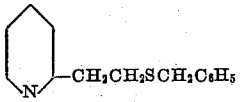

2. A pyridine having on nuclear carbon at position 2 a substituent of the formula $RSCH_2CH_2-$ wherein R is a monovalent saturated hydrocarbon radical.

3. A pyridine having on nuclear carbon a substituent of the formula $RSCH_2CH_2-$ wherein R is a monovalent saturated hydrocarbon radical.

4. A pyridine having on nuclear carbon a substituent of the formula $RSCH_2CH_2-$ wherein R is an alkyl radical.

5. A pyridine having on nuclear carbon at position 2 a substituent of the formula $RSCH_2CH_2-$ wherein R is a monovalent saturated hydrocarbon radical, the remaining positions on the pyridine nucleus being occupied by hydrogen atoms.

6. A pyridine having on nuclear carbon at position 2 a substituent of the formula $RSCH_2CH_2-$ wherein R is an alkyl radical, the remaining positions on the pyridine nucleus being occupied by hydrogen atoms.

WILLIAM HOWELLS VINTON.

REFERENCES CITED

The following references are of record in the file of this patent:

UNITED STATES PATENTS

| Number | Name | Date |
| --- | --- | --- |
| 1,367,898 | Strauss | Jan. 10, 1920 |
| 1,672,253 | Giles | June 5, 1928 |
| 1,825,662 | Hale | Oct. 6, 1931 |
| 2,352,435 | Hoeffelman | June 27, 1944 |
| 2,398,479 | Vaughan | Apr. 16, 1946 |
| 2,409,806 | Shive | Oct. 22, 1946 |

OTHER REFERENCES

Benchte, vol. 20 (1887), page 1643.

Maier: Das Pyridine and seine Derivatives (1934), p. 168.

Mayo Chem. Reviews, vol. 27, 1940, pp. 387–394.

Sidgwick: Organic Chemistry of Nitrogen (1942), pp. 522, 523 and 528.

J. Am. Chem. Soc. (1941), Dec. 8, 1941, vol. 63, p. 2283.

Sidgwick: Organic Chemistry of Nitrogen (1937), pp. 516 and 517.